Aug. 12, 1969 R. C. SIMPSON 3,460,259
NAVIGATIONAL PLOTTER-COMPUTER
Filed Aug. 10, 1967 2 Sheets-Sheet 1
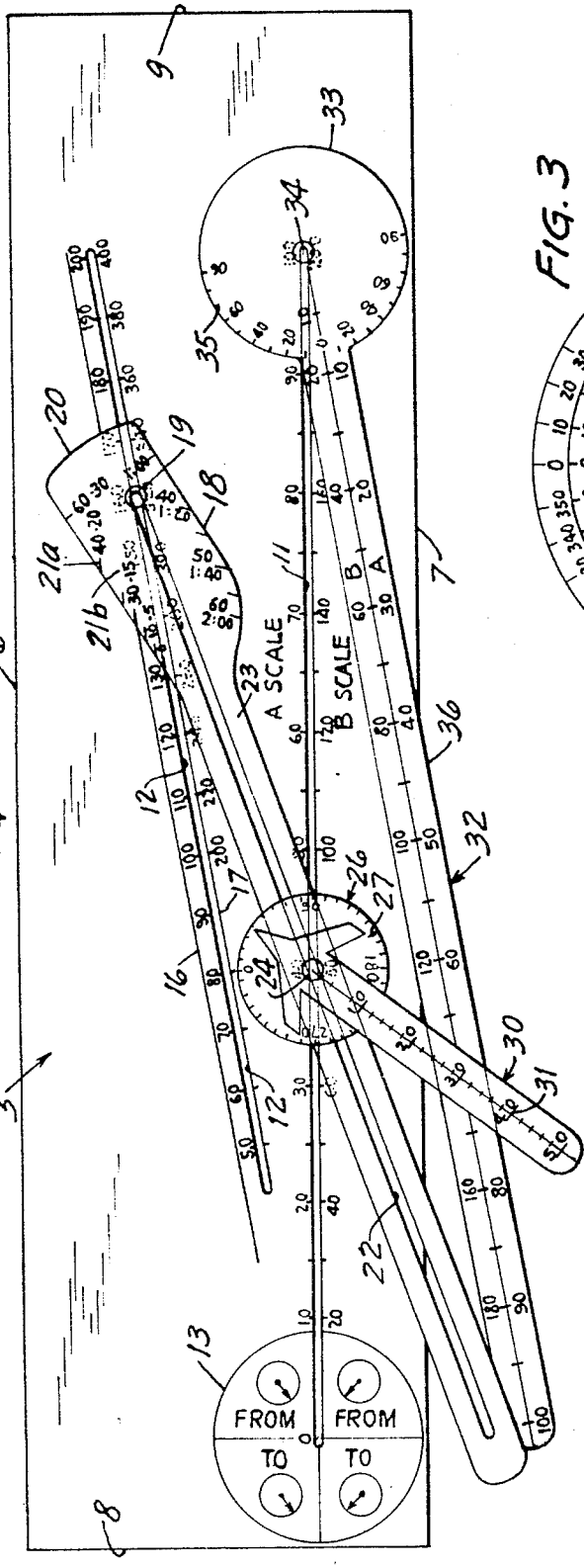
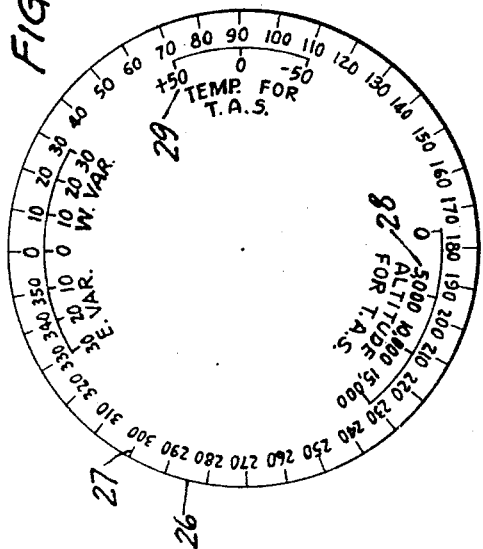
INVENTOR.
ROBERT C. SIMPSON
BY
John C. Barnes
ATTORNEY INVENTOR.
ROBERT C. SIMPSON
BY
John C Barnes
ATTORNEY

United States Patent Office 3,460,259
Patented Aug. 12, 1969

3,460,259
NAVIGATIONAL PLOTTER-COMPUTER
Robert C. Simpson, 911 8th Ave. N.,
Lewistown, Mont. 59457
Filed Aug. 10, 1967, Ser. No. 659,714
Int. Cl. G01c 21/20
U.S. Cl. 33—1                 5 Claims

ABSTRACT OF THE DISCLOSURE

A navigational device adapted to aid pilots with navigational problems arising during cross-country flying, particularly as pertains to determining true course, true air speed, ground speed, and distances during the flight, and including means for giving a pilot a graphic picture of his location during flight.

---

Figure 2:
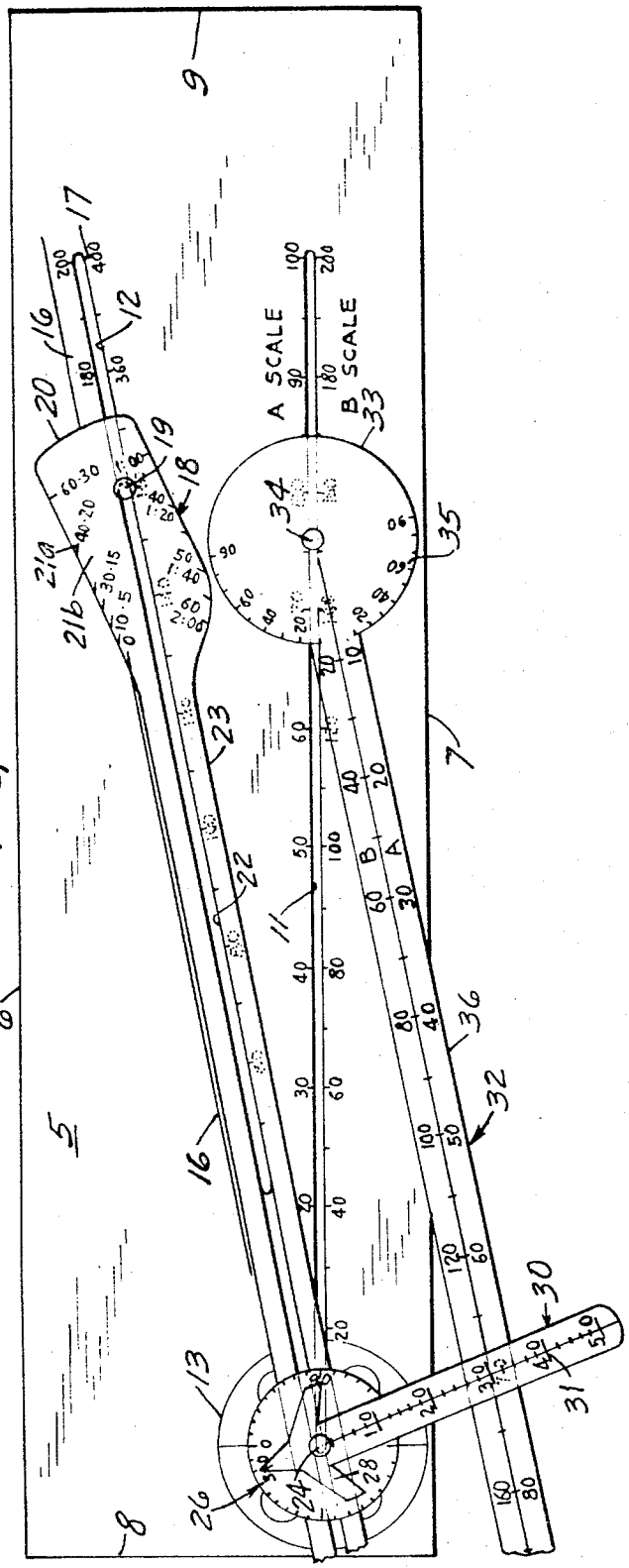

This invention relates to a navigational instrument by which a pilot may readily compute solutions to navigational problems arising during cross-country flying.

The device of the present invention will eliminate the need for a separate plotter, computer, time log, radio guide, and runway finder in determining the solution to any navigational problems which may be encountered during or before flight. The various information which a pilot must obtain and use in order to make a safe and competent cross-country flight are true course, distance, true air speed, ground speed, true heading, estimated time en route, checkpoints, runway courses, and radio receiver indications.

Prior known computers for multiple purposes are known but they have not simplified the computing of the various problems nor have they offered any convenience to the pilot, to permit their ready use during flight. The instrument of the present invention comprises few parts, all of which are joined to a base, which base is designed to be easily positioned on and oriented with the map. It may then be held during flight in a clip or lapboard on the map and is readily available for use during flight.

It is an object of the present invention to provide a device by which a pilot may readily determine the answer to any of the problems which he may encounter and to provide a device by which the pilot gains a graphic picture of his location during flight.

The above and further objects of the invention will become more apparent after reading the following detailed description which refers to the drawing wherein:

FIGURE 1 is a plan view of the navigational device;
FIGURE 2 is a second plan view with the device in a different setting; and
FIGURE 3 is an enlarged detail view of one element of said device.

Referring now to the drawing there is shown a computer device comprising a base member 5 which is rectangular in plan view and which is formed of a thin, transparent dimensionally stable material, for example "Plexiglas," which may be imprinted with scales and other indicia.

The base 5 has two opposed elongate parallel side edges 6 and 7 and shorter parallel ends 8 and 9. Extending near and parallel to the side 7 is a first elongated slotted aperture 11 which extends substantially the length of the base member. Extending at an angle of eleven degrees (11°) relative to the center line of the slot 11 is a second oblique or inclined elongated slotted aperture 12 which extends generally diagonally across the base 5. The center line of the aperture 12 extends from a point near the lower lefthand corner of the base toward the upper righthand corner, as viewed in FIGURE 1.

Positioned in the lower lefthand corner and imprinted upon the base 5 about the point where slot 11 terminates is a circle having a size corresponding to a compass rose as usually found on a "sectional" map of Civil Aeronautics Authority or "World Air Chart" map of said authority. This circle 13 is divided into four quadrants by slot 11 and perpendicular lines extending through the center of the circle, which lines are parallel to the adjacent side and edge of the base. The four quadrants, starting from the first quadrant and proceeding counterclockwise in the usual manner, are successively labeled "from," "to," "to," and "from" to indicate omni course readings and respectively, from the first quadrant counterclockwise "left," "left," "right," and "right" from the omni station.

Provided along the first slot 11 are two scales indicated as A and B, which scales are graduated to show air miles and are respectively calibrated in miles as used for mileage measurements on the "sectional" and "World Air Charts."

The A scale or sectional chart scale runs from 0 to 100 miles, and the B scale or "World Air Chart" distance is plotted from 0 to 200. These scales extend the length of the slotted aperture 11, which aperture extends from the center of the circle 13 along the base member parallel to the edge 7 toward the lower righthand side.

A line 16 is imprinted on the base 5 which extends parallel to the slot 12 and spaced in a direction toward the side edge 6 from said slot. This line 16 is a time index indicator, as will be hereinafter described.

Adjacent the lower edge of the slot 12 as shown in the drawing is an index calibrated in miles per hour from 50 to 200, with a lower scale from 200 to 400 miles per hour (beneath the first scale from 100–200) based on a statute mile scale found on a World Air Chart. This scale 17 indicates miles per hour ground speed. The mileage increments on scale 17 are each positioned along slot 12 perpendicular to the corresponding mileage indication appearing along slot 11. For example, 100 miles an hour on scale 17 is positioned along slot 12 but also along a line perpendicular to the center line of slot 11 and passing through the 100 mile indicia on scale B along slot 11. To determine speeds over 200 miles per hour, the operator will have to go to the lower scale of scale 17 and read time on the inside time scale, which is normally used for sectional charts.

A sliding arm 18, which is approximately 13 inches long and is formed of a suitable dimensionally stable transparent material and secured adjustably for movement relative to slots 11 and 12, is supported by a pin 19 which slidably mounts an enlarged, irregularly-shaped end 20 thereof in the second slot 12. The enlarged end 20 of the arm 18 is provided with a time scale consisting of a first scale 21a imprinted around its outer edge, which scale indicates time in units of 10 minutes from 0 to 2 hours, and a second scale 21b printed inwardly of the edge for use with the lower scale along slot 12 for speeds over 200 miles per hour. Extending lengthwise of the arm and centrally thereof is an elongated slotted aperture 22 which receives a second pin 24 pivotally and slidably mounting the elongated portion 23 of the sliding arm 18 in slot 11. The 0 mark on time scale 21a or 21b will be positioned on the time line 16 whenever the pin 24 is at the center of circle 13 (see FIGURE 3) or, in other words, at 0 on scale A or B along slot 11. The edge of the end 20 carrying the 0 mark of the time scales is at an angle of 11° away from the center line of the slotted aperture 22. The sliding arm 18 is thus mounted by pins 19 and 24 to the base 5 for sliding and pivotal movement within each of the slots 11 and 12.

Pivotally mounted on the pin 24 is also a circular disk 26 or rotating azimuth formed of dimensionally stable transparent material upon which is imprinted about its outer edge a compass rose as found in cartographic charts as above-referred to, with a scale 27 calibrated in degrees from 0 to 360. Also printed on the disk 26 is an altitude scale 28 and a temperature scale 29. This disk or rotating azimuth is used for measuring courses and wind direction.

Also pivotally mounted on the pin 24 which extends through the axis of the disk 26 is a third arm member 30 having an airplane-shaped figure at the end thereof mounted on the pin 24 with an elongate tail portion extending therefrom having a length of about three and one-half (3½) inches. This tail portion of the airplane-shaped figure has a scale 31 imprinted along its length from the axis of pin 24 toward the extended end which is calibrated from 0 to 50 in even increments. This scale 31 affords an index for wind speed.

The rotating azimuth or disk 26 and the airplane figure are rotatable with respect to each other and are slidable along the slotted aperture 11 and along the slot formed in the sliding arm 18.

A fourth transparent member 32, formed again of suitable dimensionally stable material as the other members, is mounted on the base 5 and is slidable along the slotted aperture 11 and pivotal with respect thereto. The member 32 includes a circular end portion 33 having a size or diameter corresponding to the size of a compass rose on an aeronautical chart, the center of which is mounted by a pin 34 within the slotted aperture 11 for sliding and pivotal movement with respect to the aperture 11. On the circular end portion 33 is a wind correction scale 35 which is calibrated in degrees on each side of the center of an integral elongate, radially outwardly extending rod or arm 36 which forms a part of and extends from the peripheral edge of the circular end portion 33 as a slender flat rod. The wind correction scale 35 is graduated for 50° right and for 50° to the left of the center line of the arm 36. Plotted along the arm 36 of the fourth member 32 from the center of the circular end portion 33 thereof and the full length of the arm 36 are two scales A and B indicating air miles of the respective sectional or World Air Charts.

The plotter of the present invention may be easily held on a chart under the clip of a clipboard for ready reference by the pilot. The plotter has many uses and to solve some of these problems the following description of the plotter is indicative.

In determining a true course the plotter computer is laid on the appropriate chart with the center of the slotted aperture 11 extending along the true course line which should be drawn on the chart by the use of edge 6 from the point of origin of the flight to the destination. The rotating azimuth should be moved along the slotted aperture 11 until the pin 24 is positioned on a line of longitude on the chart. The rotating azimuth 26 should then be rotated until the zero on the scale 27 is on the line of longitude. The true course can be read easily from the 0 mark around the scale 27 to the indicia indicating number of degrees positioned above the true course line drawn on the map and positioned at the center of the slotted aperture.

A distance measurement is made by laying the plotter-computer on the chart with the center point of the circle 13, which is divided into the quadrants, on the point of origin, and with the slotted aperture 11 positioned along the course line. Depending on the chart used, the distance can then be read on either scale A or B positioned along the slotted aperture 11. When using a regional chart and the distance exceeds 200 miles, the fourth member 32 may be rotated about the pin 34 and moved to the far right end of the slotted aperture 11 to extend along the true course line toward the destination. The distance greater than the 200 miles can then be read off the mileage scale B on the member 32.

When the distance remaining from a point to the destination is to be found, the center of the circular end portion 33 of member 32 or pin 34 is placed on the point of destination, with the plotter so set that the pilot can then read the distance remaining to the destination by reading eiher the A or B scale on the arm portion 36 of the member back to the pin 24 which is positioned at the check point or present plane position.

To determine the true air speed the pin 24 should be moved along the slotted aperture 11 until it is located at a mileage reading corresponding to the indicated air speed taken from the indicator of the plane. Then rotate azimuth 26 until the correct temperature reading on scale 29 is parallel to the center of slot 11. Then rotate the arm 30 until the point 39 of the airplane-shaped figure is on the given altitude on scale 28. This operation will cause the true air speed to be read on the scale 17 along the slotted aperture 12 by the intersection of the center line of scale 31 on scale 17.

To determine ground speed, slide the pin 24 along the slotted aperture 11 so that it is located at the center of the circle 13 on the lefthand end of the slotted aperture 11. With the rotating azimuth 26 set to the true course, rotate the point 39 on arm 30 to the given wind direction. Plot on the wind scale 31 the given velocity of the wind. Slide the fourth member 32 and pin 34 along the slotted aperture 11 and simultaneously rotate the member 32 unil the appropriate true air speed in miles per hour is located on the B scale of arm 36 on the member 32 and intersects the wind velocity reading on the scale 31. The ground speed may then be read on scale B along the slotted aperture 11 at the position of the pin 34. The wind correction angle is then read on scale 35. On the drawing, in FIGURE 2, the plotter-computer of the present invention is positioned to indicate a true course of 90°, wind direction of 340°, with the wind velocity of 30 miles per hour; and with the true air speed of 140 indicated on B scale of arm 36, and reading the ground speed on the B scale along slotted aperture 11, the ground speed is computed as 153 miles per hour and the wind correction angle is shown to be 13°, as measured along the wind correction scale 35 of end portion 33.

To plot time, speed, and distance, the sliding arm 18 is moved along the slotted aperture 12 until the pin 19 is positioned along the scale 17 to correspond with the ground speed. As shown in FIGURE 1, the sliding arm 18 is set at the ground speed of 160 miles per hour. Rotate the sliding arm about the now stationary pin 19 so that the desired time (being sure to use the proper time scale, the outer for world air and inner for sectional charts) on the scale 21 intersects the time index line 16. The diagram shows the time of 30 minutes on the outer scale. The distance traveled can then be read at the location of pin 24 in the slotted aperture 11 from either scale A or B, depending upon the chart used and on scale B, the distance traveled is indicated to be 80 miles.

To locate the runway the rotating azimuth or disk 26 should be set on the true course, and the airplane member 28 should be rotated to the given runway direction. The pilot can then visualize his relative position to the runway as indicated on the chart.

To receive the radio receiver indications or "very high frequency omni-directional radio range," i.e. VOR readings and relate these to the chart, the omni receiver of the airplane is set on the departure station giving the VOR signal. The base of the plotter should then be set with the circle 13 placed on the compass rose on the map over the departure station sending the VOR signal. By reference to the radio receiver indications the pilot can then tell his relative position to the omni station. For example, if the pilot has a "from" indication and the left-right needle is displaced to the right, he will know what quadrant he is in. Reference to the drawing shows he would find that he is in quadrant 1.

Having thus disclosed my invention with reference to the drawing which indicates the preferred embodiment of my device, it will readily be understood that my invention provides a device which will alleviate the need for the pilot to carry a number of separate instruments in making a cross-country flight. This device can be utilized to solve any navigation problems which may arise. The device of the present invention will give the pilot a graphic picture of his location with reference to an aeronautical chart and will show the pilot where he should be at all times without mental mathematics and the distraction of finding the solution to these problems by the normally needed plotters, computers, time logs, radio guides, and other instruments.

What is claimed is:

1. A plotter-computer comprising
   a rectangular transparent base member with opposite parallel sides;
   means defining a first slot in said base member extending generally parallel to and adjacent one of said sides, and a second slot which is oblique to the first slot and extends in a manner to converge with one end of said first slot at an angle of 11° thereto;
   a scale in miles positioned along the edge of said first slot and graduated to correspond with the mileage calibrations of an aeronautical chart;
   a second mileage scale positioned along said second slot and calibrated in miles per hour in accordance with measurements on a said aeronautical chart;
   a printed line on said base member parallel to said second slot;
   a disk having imprinted thereon a compass rose, temperature scale and altitude scale;
   a pointed wind scale member;
   means for pivotally mounting said disk and said wind scale member to each other with the center of said disk and the zero point of the wind scale member being joined and mounted for slidable movement along said first slot; and
   a sliding arm having an enlarged end portion and a straight elongated arm portion, means pivotally and slidably mounting said end portion in said second slot, a time scale positioned about the edge of said end portion to cooperate with said printed line, means defining an elongated aperture in said arm portion, said aperture slidably receiving said means for pivotally mounting and slidably mounting said disk and wind scale in said first slot, and slidably mounting said sliding arm to said base member at said first slot,
   whereby true air speed, distance traveled in a given time, and time to travel a given distance can be readily determined by a pilot during flight.

2. A plotter-computer comprising
   a rectangular transparent base member,
   means defining in said base member a first straight elongated slot and a second straight elongated slot, said second slot being angularly related to the first slot and extending toward but terminating short of convergence with one end of said first slot;
   a mileage scale formed along each of said slots and graduated to correspond with the mileage calibrations of a usual aeronautical chart;
   a transparent disk having imprinted thereon a compass rose; altitude scale and temperature scale;
   a transparent wind scale member having at one end an arrow-head shaped and imprinted lengthwise thereon a scale in miles per hour with the arrow-head adjacent the 0 on said scale;
   means pivotally mounting said disk and said wind scale member to each other with the center of said disk and the zero point of the wind scale member being joined and mounted for slidable movement along said first slot;
   a transparent sliding arm pivotally mounted at one end in said second slot and slidable therealong and formed with an elongate aperture which aperture slidably receives the means for pivotally mounting and slidably mounting said disk and wind scale in said first slot, and
   a fourth member having a generally circular end mounted at its center to the base and slidably mounted in said first slot and having a radially outwardly extending elongated integral arm with a mileage scale printed thereon corresponding to the scale along said first slot with 0 at its pivot point.

3. A plotter-computer according to claim 2 wherein a fixed time line is positioned along and parallel to said second slot, and said sliding arm is formed with a time scale around the pivoted support for said arm in said second slot to be intersected by said fixed time line upon pivotal movement of said sliding arm.

4. A plotter-computer according to claim 2 wherein said circular end of said fourth member has a size corresponding to the compass rose on a said aeronautical chart and adjacent said edge on each side of said integral arm is a circular scale in degrees to plot wind correction angle after determining true ground speed.

5. A plotter-computer as claimed in claim 1 wherein a fourth member having a circular end corresponding in size to a compass rose on a said aeronautical chart and n elongated radially outwardly extending arm portion is pivotally and slidably mounted at the center of said circular end to the base in said first slot, said arm portion carrying a mileage scale corresponding to the scale along said first slot with the 0 point on the scale located at said center of said circular end.

References Cited

UNITED STATES PATENTS

| | | |
|---|---|---|
| 1,828,807 | 10/1931 | Kennedy. |
| 1,917,278 | 7/1933 | Weems. |
| 1,969,939 | 8/1934 | Nelson. |
| 2,433,249 | 12/1947 | Van Sciever. |
| 3,281,942 | 11/1966 | Preuit. |

WILLIAM D. MARTIN, Jr., Primary Examiner

U.S. Cl. X.R.

33—76